United States Patent [19]

Osborn

[11] Patent Number: 4,850,944
[45] Date of Patent: Jul. 25, 1989

[54] HOT AIR HEM SEALER HEAT EXCHANGER

[75] Inventor: Paul V. Osborn, Webster, N.Y.

[73] Assignee: Mobil Oil Corporation, New York, N.Y.

[21] Appl. No.: 181,933

[22] Filed: Apr. 15, 1988

[51] Int. Cl.⁴ .......................... B31B 23/64; B31B 1/90
[52] U.S. Cl. ........................................ 493/5; 493/191; 493/193; 493/225; 493/928; 156/497
[58] Field of Search .................. 493/5, 37, 190, 191, 493/192, 193, 206, 209, 225, 381, 386, 928; 156/82, 497, 499; 53/373; 219/365

[56] References Cited

U.S. PATENT DOCUMENTS

| | | | |
|---|---|---|---|
| 2,897,729 | 8/1959 | Ashton et al. | |
| 2,928,220 | 5/1960 | Kannengiesser et al. | 53/180 |
| 3,029,853 | 4/1962 | Piazzi . | |
| 3,058,402 | 10/1962 | Kugler . | |
| 3,058,403 | 10/1962 | Kugler . | |
| 3,488,244 | 1/1970 | Lepisto | 156/359 |
| 4,558,463 | 12/1985 | Boyd . | |
| 4,597,750 | 7/1986 | Boyd . | |
| 4,617,008 | 10/1986 | Boyd . | |
| 4,624,654 | 11/1986 | Boyd . | |
| 4,631,388 | 12/1986 | Manning | 219/365 |
| 4,714,454 | 12/1987 | Herrington | 493/193 |
| 4,714,455 | 12/1987 | Herrington . | |

FOREIGN PATENT DOCUMENTS 1125363  1/1967 United Kingdom .

*Primary Examiner*—Frederick R. Schmidt
*Assistant Examiner*—Jack Lavinder
*Attorney, Agent, or Firm*—Alexander J. McKillop; Charles J. Speciale

[57] ABSTRACT

Apparatus for heat sealing the respective layers of film in a pair of hems in a moving web of film in the manufacture of draw tape bags. A pair of hot air hem sealer units is provided each of the units including a hot air hem sealer heat exchanger having a plurality of nozzles which direct hot air against a continuously moving film. The nozzles are in line with film movement and the film is backed up by a metal plate positioned between the hems. Following the heating phase cool compressed air is directed against the film in the heated area to cool the film prior to contact with the hem seal on the other side of the bag. The heat exchanger includes a plurality of circumferential grooves which deliver hot air to the nozzles. A thermocouple controls the temperature of the hot air.

5 Claims, 5 Drawing Sheets

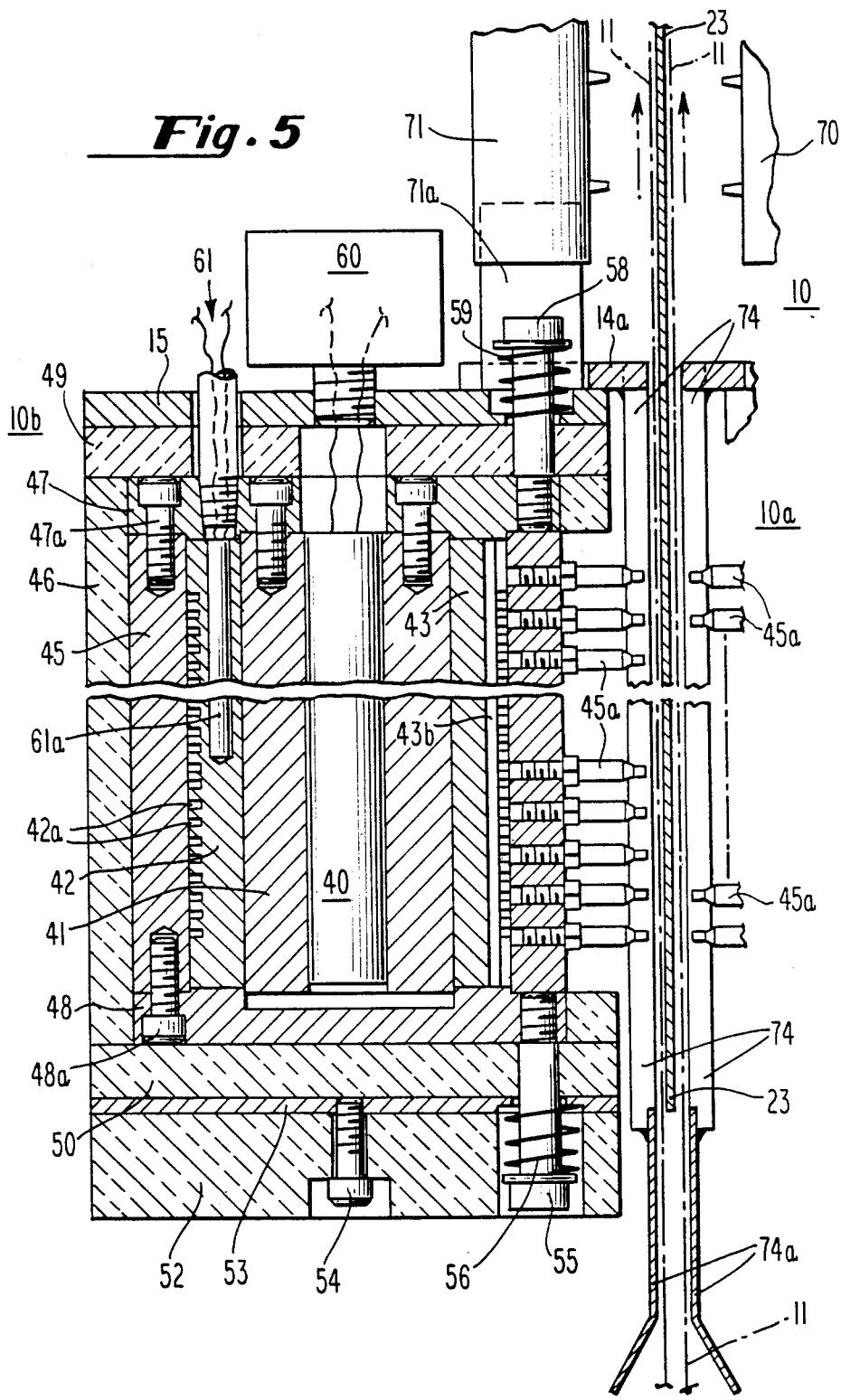

HOT AIR HEM SEALER HEAT EXCHANGER

BACKGROUND OF THE INVENTION

This invention relates to a hot air hem sealer heat exchanger for producing heat seals for sealing a pair of hems in a moving web of thermoplastic film and more particularly to the manufacture of draw tape plastic bags.

Bags made of thin polyethylene materials have been used in various sizes. Small bags are used in the packaging of samples and the like. Larger bags are used as shopping bags; and even larger bags are used for containing trash.

A particularly advantageous closure for such a bag includes a draw tape constructed from the same polyethylene material. U.S. Pat. No. 3,029,853—Piazzi and British Pat. No. 1,125,363—Jortikka are examples of draw tape bags. Such closures have been successfully employed on these bags.

Draw tape closures for large trash bags, and the manufacture of these draw tape trash bags, are described in U.S. Pat. Nos. 2,897.729—Ashton et al, 3,058,402—Kugler, 3,058,403—Kugler, 4,597,750—Boyd et al, 4,617,008—Boyd et al, 4,624,654—Boyd et al, 4,558,463—Boyd and 4,714,454—Herrington.

Draw tape hems have previously been made by various methods. One method is to use a Teflon-coated hot bar which opens and closes against the film in the area of the bag machine where the film starts and stops. The bar closes once during each cycle while the film is stopped. Another method is to use a pair of heated belts to produce a machine-direction seal. Another method is to use a plurality of heated rollers to produce machinedirection heat seals as disclosed in the aforesaid U.S. Pat. No. 4,714,454. Another method is to blow a series of hot air jets against the film as it travels by. One example of this method is disclosed in the aforesaid U.S. Pat. No. 4,558,463.

It is an object of the present invention to seal a pair of hems in a web of film moving at a relatively high speed, such as 250/300 feet per minute, where the seal in the hem is produced by a hot air hem sealer heat exchanger.

SUMMARY OF THE INVENTION

The present invention is directed to a machine for making draw tape bags having front and back panels from thermoplastic film wherein the opposing panels of a moving web of folded film have each of their edges opposite the fold folded over to form a hem comprising two opposing layers of film in each edge to provide a pair of opposing hems for receiving draw tapes and particularly to apparatus for heat sealing the respective layers of film in the pair of hems in the moving web of film. The apparatus comprises an elongated seal plate mounted along the path of the moving web and between the pair of hems and a pair of hot air hem sealer units positioned on opposite sides of the seal plate with the respective hems therebetween. Each of the hot air hem sealer units comprises a heat reservoir, means for supplying air to each reservoir and means for heating the air in each heat reservoir. Each reservoir has a plurality of grooves extending around the periphery of the heat reservoir to receive and heat the air and a plurality of hot air nozzles carried by each hot air hem sealer unit and communicating with the grooves. The nozzles extend lengthwise of each hot air hem sealer unit and along the path of travel of the pair of hems. The nozzles cooperate with the seal plate to produce a heat seal in the respective hems. Means is provided for moving the heat sealer units into and out of operating position with respect to the seal plate and means for adjusting the heat seal units transversely with respect to the path of travel of the pair of hems.

In accordance with another aspect of the invemtion the apparatus includes means supported on opposite sides of the seal plate for directing cool air against the heat seal in the respective hems after the hems have moved through the hot air nozzles and prior to the hems moving beyond the seal plate. Heat sensing means is also provided for sensing the temperature of the air in each reservoir.

In accordance with a further aspect of the invention each heat reservoir includes a heat transfer member having an inlet channel and an outlet channel cooperating with the opposite ends of the plurality of grooves, the inlet channel being connected with the means for supplying air to each reservoir and the outlet channel being connected to the plurality of hot air nozzles.

In accordance with a further aspect of the invention a pair of hot air hem sealer units is mounted on a pair of pivoted arms, both the pivoted arms being mounted on a slide member carried by a support guide and adjustable relative thereto for adjusting the position of the heat seal units transversely with respect to the path of travel of the pair of hems.

The foregoing and other objects, features and advantages of the invention will be better understood from the following, more detailed description and appended claims.

BRIEF DESCRIPTION OF THE DRAWING

FIG. 5 is a sectional view taken along the lines 5—5 in FIG. 4.

DESCRIPTION OF THE PREFERRED EMBODIMENT

Figure 1:
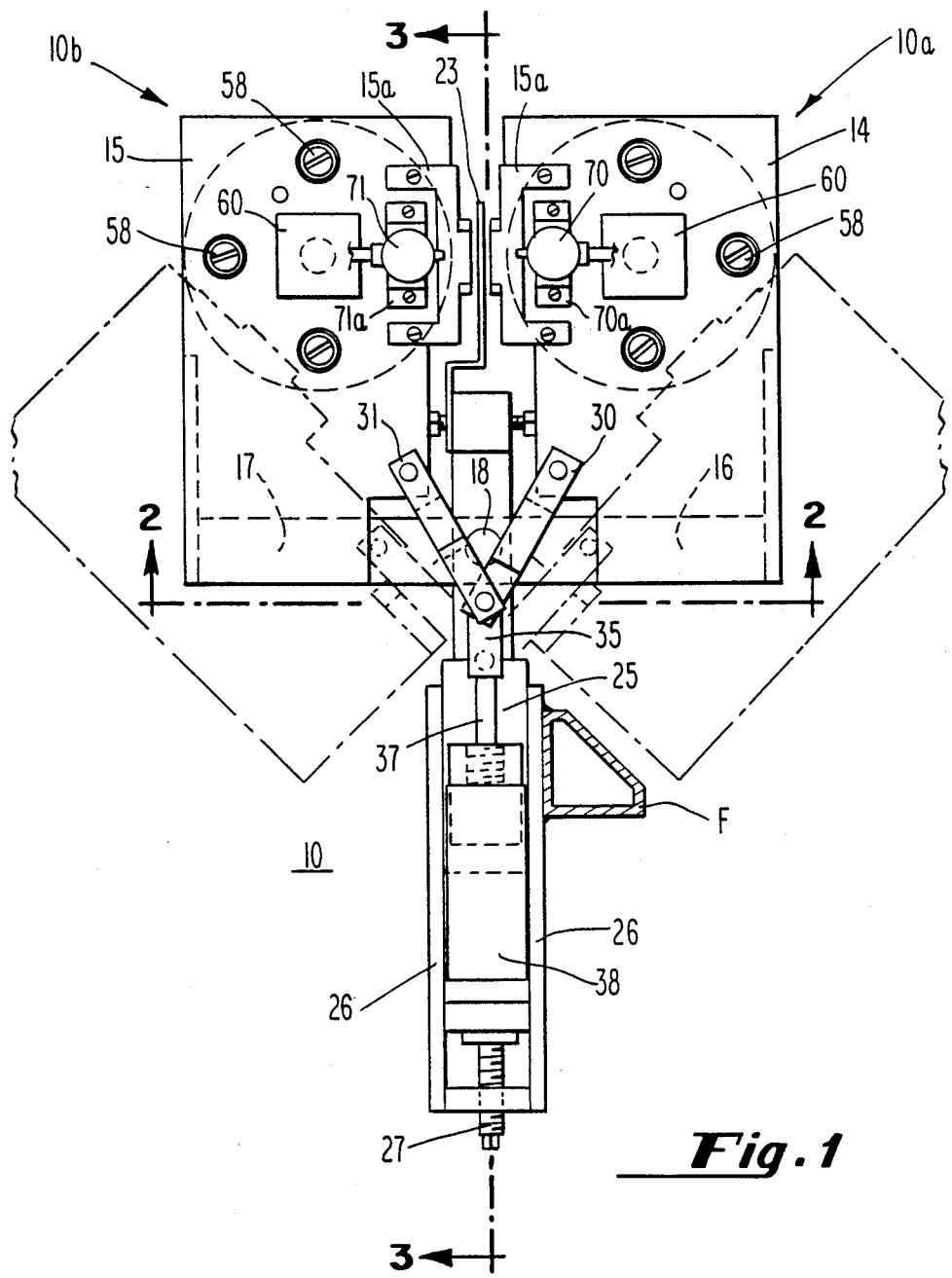
FIG. 1 is a top plan view of a hot air hem sealer heat exchanger embodying the present invention.
Figure 2:
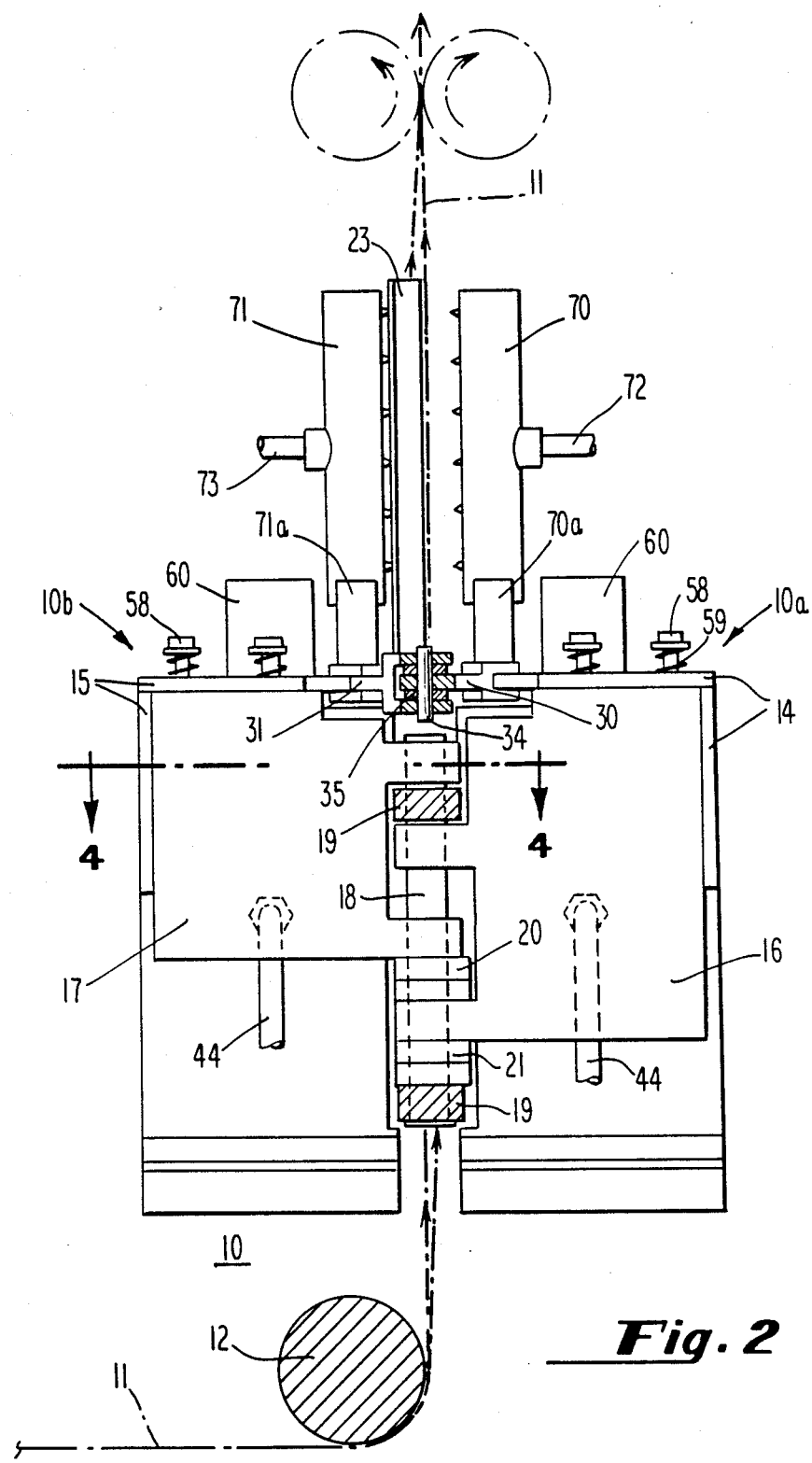
FIG. 2 is a side elevation taken along the lines 2—2 in FIG. 1.

Referring to FIGS. 1 and 2 there is shown a hot air hem sealer 10 embodying the present invention. The hot air hem sealer is adapted to seal a draw tape in a hem of a thermoplastic film to be formed into a draw tape bag. The hot air hem sealer apparatus 10 comprises a right hand unit 10a and a left hand unit 10b the purpose of which will now be described. As shown in FIG. 2 the web of thermoplastic film 11 prior to reaching the roll 12, but closely adjacent thereto, has passed through a hem former and tape inserter (not shown) which may be of a type known in the art such for example as the type disclosed in aforesaid U.S. Pat. No. 4,597,750. The web of thermoplastic film has been folded over so that it comprises two panels facing each other each having a hem extending along one of the edges and each hem having a thermoplastic draw tape inserted therein. The hems with the thermoplastic draw tapes inserted therein pass around the roller 12 and move upwardly through the hot air hem sealer apparatus 10 where the hems will be heat sealed. One of the hems will be heat sealed by the right hand hot air hem sealer unit 10a and the other hem will be heat sealed by the left hand hot air sealer 10b.

Figure 3:
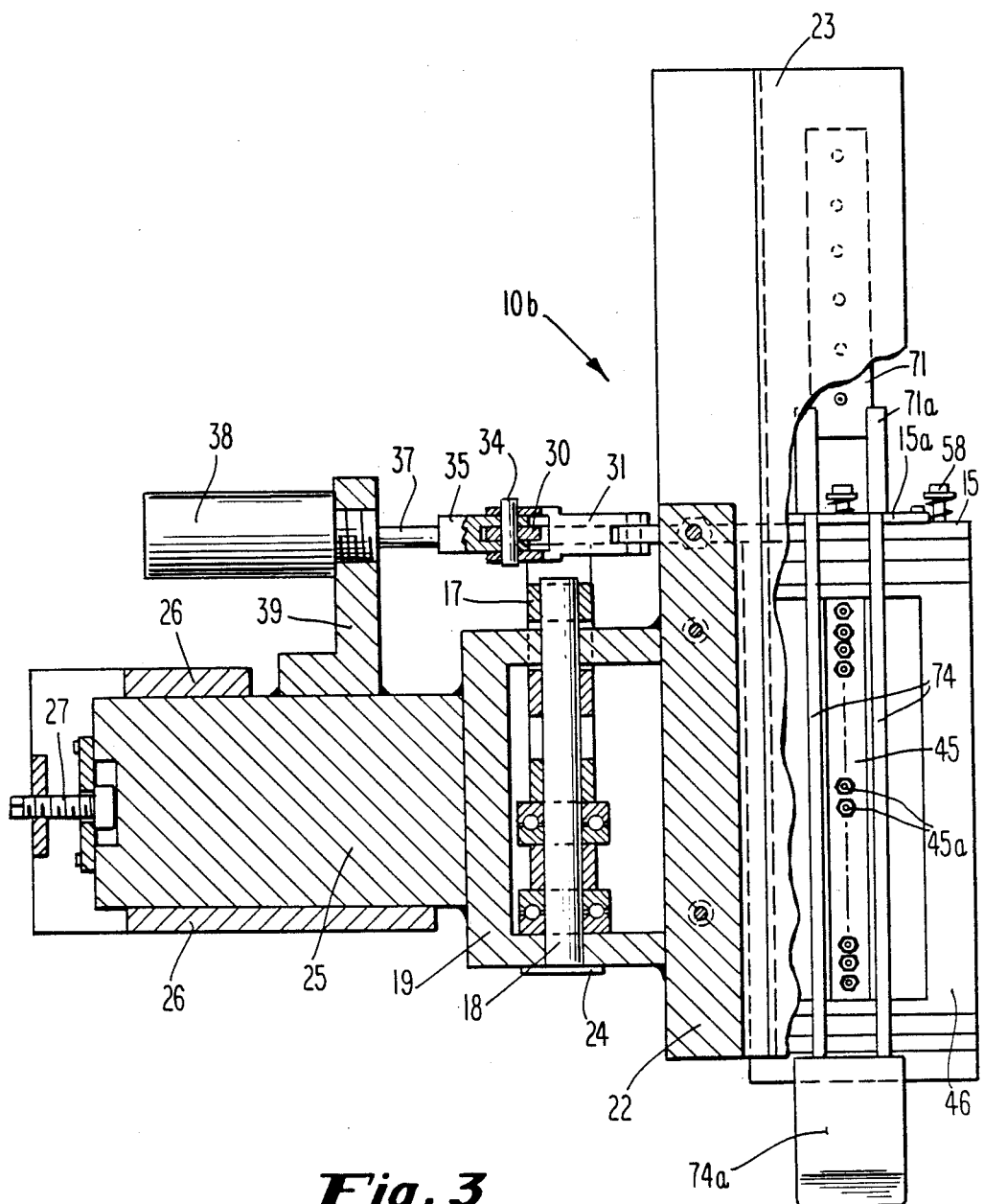
FIG. 3 is a sectional view taken along the lines 3—3 in FIG. 1.

As may be seen in FIG. 1 the hot air hem sealer apparatus 10 is supported on a vertical frame F which provides a support for both the left hand and right hand hot air hem sealers 10a and 10b. As shown in FIGS. 1 and 2, the right hand unit 10a includes a support member 14 and the left hand unit 10b includes a support member 15. The right hand support member 14 is carried by a pivoted arm 16 and the left hand support member 15 is carried by a pivoted arm 17. Both of the arms 16 and 17 are mounted on a hinge pin 18 which in turn is carried by a hinge block 19, FIG. 2. Also mounted on the hinge pin 18 are a pair of thrust ball bearings 20 and 21. Also connected to the hinge block 19 is a block pad 22, FIG. 3, which in turn supports a vertical seal bar 23, the purpose of which will hereinafter be described. The hinge pin 18 is adapted to be held in place by a retainer plate 24. The hinge block 19 is carried by a slide block 25 which is adjustable in a horizontal guide 26 which is in turn supported by the vertical frame F as shown in FIG. 1. The slide block 25 is adjustable longitudinally of the guide 26 by an adjusting screw 27, the purpose of which will later be described. As shown in FIG. 1 each of the support members 14 and 15 is connected by a link 30 and 31, respectively, to a clevis pin 34 carried by a clevis 35 which in turn is mounted on the cylinder rod 37 of an air cylinder 38. The air cylinder 38 is mounted on a bracket 39 which in turn is carried by the slide block 25, FIG. 3.

Figures 4, 4A:
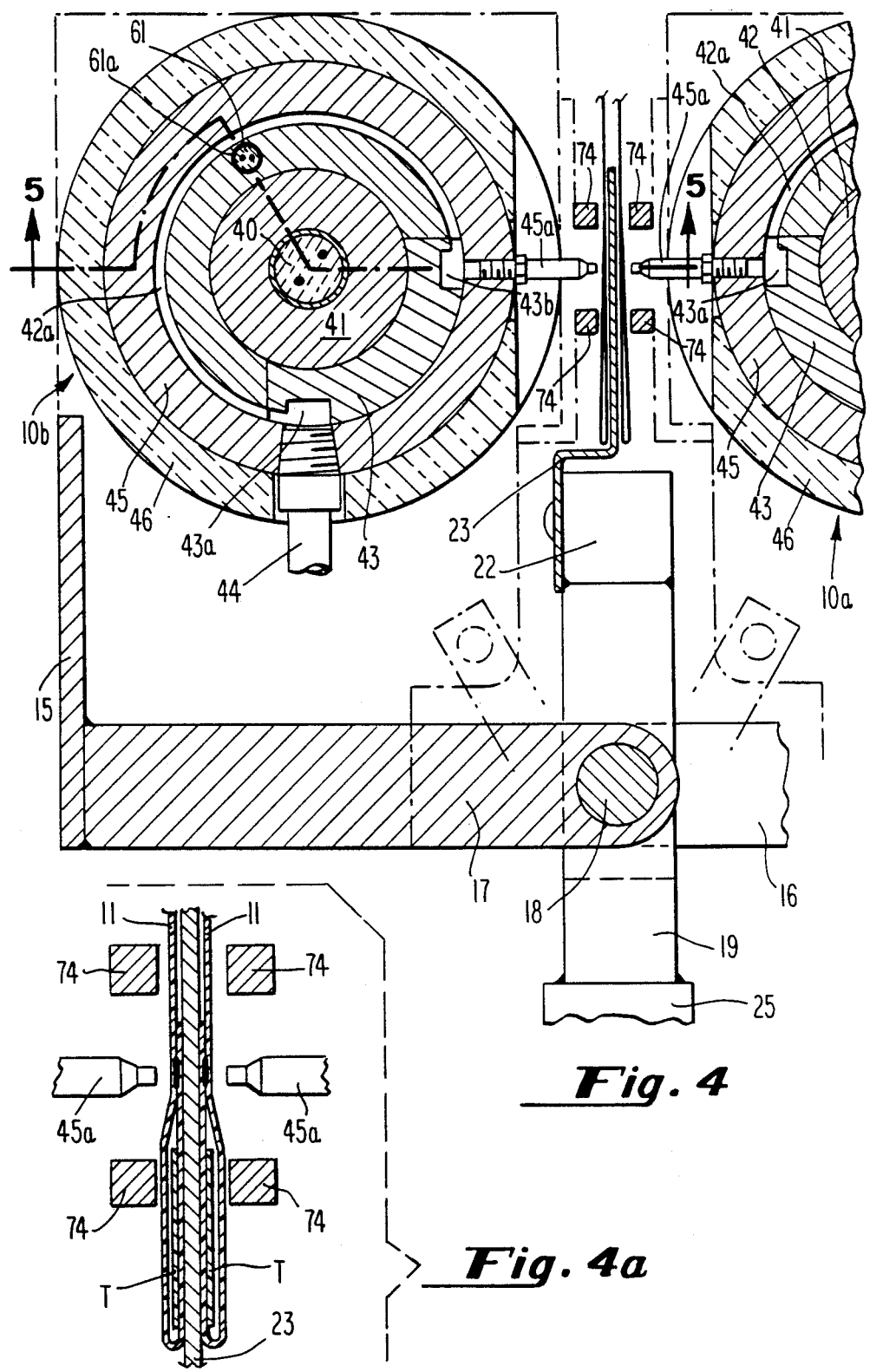
FIG. 4 is a sectional view on enlarged scale taken along the lines 4—4 in FIG. 2.
FIG. 4a is an enlarged view of the hot air hem sealer jets shown in FIG. 4.

The hot air hem sealer heat exchanger units 10a and 10b will now be described. Each of these units is of the same construction except unit 10a is right hand unit and unit 10b is a left hand unit. Referring to FIGS. 4 and 5 it will be seen that the left hand unit 10b includes a central heater in the form of a rod 40. The heater rod 40 is surrounded by an inner heat exchanger shell 41 preferably made from brass or equivalent heat conducting material. The inner shell 41 is surrounded by a metal heat transfer tube 42 having outer circumferential grooves 42a which extend around the periphery of the tube 42. The grooves 42a may be straight or of spiral configuration and extend along the length of the heat transfer tube 42. As shown in FIG. 4 the tube 42 has a quarter segment removed and replaced by a flow separator segment 43. The flow separator segment 43 is provided with longitudinal inlet and outlet channels 43a and 43b into which the opposite ends of the circumferential grooves 42a terminate. The grooves 42a are adapted to receive air through inlet channel 43a from a supply 44, the air being adapted to be heated by the heater rod 40, as hereinafter described. An outer metal shell 45 of the heat exchanger surrounds the tube 42 and flow separator 43. The tube 42 and flow separator 43 and the outer shell 45 are preferably made from brass or other equivalent heat conducting material. The outer heat exchanger shell 45 is surrounded by a cylindrical heat insulator shell 46 of heat insulating material. The heat exchanger unit 10b is provided with a top heat exchanger plate 47 and a bottom heat exchanger plate 48 both of which are preferably made from brass or equivalent heat conducting material. The unit 10b includes a top insulator plate 49 and a bottom insulator plate 50 both of which are made of heat insulating material. The top and bottom plates 47 and 48 are secured to the sleeves 45, 42 and 41 by a plurality of screws 47a and 48a. The bottom of the unit 10b is provided with an insulator plate 52 which is secured to a retainer plate 53 by a screw 54. The plates 50, 52 and 53 are secured to the bottom heat exchanger plate 48 by a plurality of shoulder screws 55 having biasing springs 56 which engage the retainer plate 53, FIG. 5. The unit 10b is suspended from the support member 15 by a plurality of shoulder screws 58 having biasing springs 59.

The heating of the rod 40 is provided by a suitable electrical source 60 which is controlled by a thermocouple 61 which in turn is positioned within a well 61a in the wall of the heat transfer tube 42. The heat control 60 and the thermocouple 61 are adjusted so as to heat the air supplied from pipe 44 through vertical channel 43a to the grooves 42a in the shell 42 to a temperature of approximately 700° F. The air supplied through the cylindrical grooves 42a is at about 5 psi and expands through a plurality of nozzles 45a that extend radially through the tubular member 45. The inner ends of the nozzles 45a communicate with the vertical outlet channel 43b in the flow separator 43, FIG. 4. In one embodiment of the invention the grooves 42a were 1/32" wide by 1/16" deep on 1/16" pitch for a length of 7 inches on tube 42. The tubular member 45 had 20 nozzles having a diameter of 0.025" distributed vertically of the unit 10b and adapted to provide hot air to impinge against the continuously moving film web 11. The heater 40 was a 2 KW unit. As may be seen in FIGS. 4 and 4a, the nozzles 45a direct the hot air from the heat exchangers against the thermoplastic film web 11 at the respective hems and seal the free edges of the hems to the adjacent side walls of the bag material at 11a with the draw tapes T therein. As may be seen in FIGS. 4 and 4a the thermoplastic bag material web 11 passes over the opposite sides of the central seal plate 23.

After the heat sealed hems leave the hot air hem sealer units 10a and 10b they proceed along the plate 23, FIG. 5 to a position between a pair of cool air manifolds 70, 71, FIG. 1 which are supplied from a suitable supply of cool compressed air by way of pipes 72 and 73. The jets on the manifolds 70 and 71 direct cool compressed air against the film web 11 in the heated areas 11a of the heat seals to cool the film prior to contact of the one hem seal with the other hem seal at the other side of the bag. It will be noted that the seal plate 23 keeps the heat sealed hems separated until they have cooled. It will also be noted that the vertical guide members 74, 74a supported from the members 14 and 15 by brackets 14a and 15a keep the hems in the web 11 from coming in contact with the nozzles 45a, FIGS. 3-5.

The cool air manifolds 70 and 71 are supported by brackets 70a, 71a on their respective support members 14 and 15 of the right hand unit 10a and the left hand unit 10b, FIGS. 1 and 2. When the hot air hem sealer heat exchange units 10a and 10b are in operation, the thermoplastic film web 11 is continuously moving through the units as illustrated in FIG. 2. The units 10a and 10b are positioned closely adjacent the opposed surfaces of the web 11 where they perform the respective heat sealing and heat cooling operations previously described. When the hot air hem sealer heat exchanger 10 is not in operation the right hand and left hand units 10a and 10b are moved from their full line positions shown in FIG. 1 to their phantom line positions shown also in FIG. 1. This is accomplished by means of the air cylinder 38 which is adapted to move the plunger 37 thereby causing the links 30, 31 to pivot the support members 14 and 15 and their respective arms 16 and 17 away from the path of travel of the web of film 11. This provides for ease in insertion or removal of the web of film 11 at the beginning or end of a run or when it is necessary to stop the system, as the case may be. The position of the heat seal 11a in the hems of the web 11 may be adjusted by moving the set screw 27, FIGS. 1 and 2 which is adapted to move the guide member 25 with respect to the support 26. This adjusts the position of the nozzles 45a and thus the location of impingement of the hot air on the web 11.

With hot air hem sealer heat units of the type disclosed herein the hot air for the units may be carefully controlled both as to temperature and pressure and the hot air is adapted to expand through the plurality of nozzles before impinging against the continuously moving film. The hot air hem sealer heat exchanger of the present invention has the further advantages that it is easily adjusted, there are no moving parts during the heat sealing operation and the hem sealer can be positioned close to the point of tape insertion into the hems thus allowing for short hems.

What is claimed is:

1. In a machine for making draw tape bags having front and back panels from thermoplastic film wherein the opposing panels of a moving web of folded film having each of their edges opposite the fold folded over to form a hem comprising two opposing layers of film in each edge to provide a pair of opposing hems for receiving draw tape, apparatus for heat sealing the respective layers of film in the pair of hems in the moving web of film comprising:

an elongated seal plate mounted along the path of the moving web and between the pair of hems, a pair of hot air hem sealer units, said units positioned on opposite sides of said seal plate with the respective hems therebetween, each of said hot air hem sealer units comprising a heat reservoir, means for supplying air to each said reservoir, means for heating said air in each said heat reservoir, each said reservoir having a plurality of grooves extending around the periphery of said heat reservoir and along the length thereof to receive and heat the air, a plurality of hot air nozzles carried by each said hot air hem sealer unit and communicating with said grooves, said nozzles extending lengthwise of each said hot air hem sealer units and along the path of travel of the pair of hems, said nozzles cooperating with said seal plate to produce a heat seal in the respective hems, means for moving said hot air hem sealer units into and out of operating position with respect to said seal plate, and means for adjusting position with respect to said seal plate, and means for adjusting said hot air hem sealer units transversely with respect to the path of travel of the pair of hems; wherein said pair of hot air hem sealer units is mounted on a pair of pivoted arms, both said pivoted arms being mounted on a slide member carried by a support guide and adjustable relative thereto for adjusting the position of said hot air hem sealer units transversely with respect to the path of travel of the pair of hems.

2. Apparatus according to claim 1 including means supported on opposite sides of said seal plate for directing cool air against the heat seal in the respective hems after the hems have moved through the hot air nozzles and prior to the hems moving beyond said seal plate.

3. Apparatus according to claim 1 including means for sensing the temperature of the air in each said heat reservoir.

4. Apparatus according to claim 1 wherein said grooves of said heat reservoir have a spiral configuration.

5. Apparatus according to claim 1 wherein each said heat reservoir includes a heat transfer member having an inlet channel and an outlet channel cooperating with the opposite ends of said plurality of grooves, said inlet channel being connected with said means for supplying air to each said reservoir and said outlet channel being connected to said plurality of hot air nozzles.

* * * * *